(12) United States Patent
Stepanian

(10) Patent No.: US 7,609,824 B2
(45) Date of Patent: *Oct. 27, 2009

(54) TETHERED DIGITAL BUTLER CONSUMER ELECTRONIC DEVICE AND METHOD

(75) Inventor: Robert Stepanian, San Jose, CA (US)

(73) Assignee: NexStep, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/420,723

(22) Filed: Apr. 8, 2009

(65) Prior Publication Data

US 2009/0233592 A1    Sep. 17, 2009

Related U.S. Application Data

(63) Continuation of application No. 12/210,782, filed on Sep. 15, 2008, now Pat. No. 7,542,753, which is a continuation of application No. 11/465,749, filed on Aug. 18, 2006, now Pat. No. 7,444,130, which is a continuation-in-part of application No. 11/350,980, filed on Feb. 8, 2006, now Pat. No. 7,389,103.

(60) Provisional application No. 60/709,666, filed on Aug. 19, 2005.

(51) Int. Cl.
*H04M 11/00* (2006.01)
(52) U.S. Cl. ............... 379/102.03; 370/352; 455/344
(58) Field of Classification Search .............. 455/403, 455/344; 713/186; 725/11, 6; 382/124; 379/88.17, 102.03, 102.01, 102.02; 370/352
See application file for complete search history.

(56) References Cited

U.S. PATENT DOCUMENTS 5,546,471 A    8/1996    Merjanian
(Continued)

FOREIGN PATENT DOCUMENTS

JP    2003116074    4/2003

OTHER PUBLICATIONS

PCT International Search Report for International Application No. PCT/US06/32527, mailed Sep. 24, 2007.

*Primary Examiner*—Olisa Anwah
(74) *Attorney, Agent, or Firm*—Ernest J. Beffel, Jr.; Haynes Beffel & Wolfeld LLP

(57) ABSTRACT

The present invention relates to a tethered digital butler consumer electronics product and method. The tethered digital butler, of a price and form factor suitable for consumer electronics markets of developed and developing countries, includes a communications and multi-media console and a wireless remote. The remote may resemble a handheld personal computer (HPC), a palm-held personal computer (PPC or PDA) or a smart phone, but has a low cost and feature set supported by the console that is novel in the consumer electronics market. In particular, this disclosure relates to combining telephone service, device control and, optionally, a fingerprint reader for easy user identification/authorization and personalization. As another option, a camera can be incorporated into the remote, thereby enabling video conferencing and other visual features. Alternatively, the remote may be packaged separately from a console and sold to interact with capabilities of a communications and console, set-top box, multi-media PC or other consumer electronics device from a different source, such as one running on a Windows, OS X or Linux platform, with or without telephone capabilities. The remote may include a media reader and remote USB port.

25 Claims, 6 Drawing Sheets

U.S. PATENT DOCUMENTS

| | | |
|---|---|---|
| 5,650,831 A | 7/1997 | Farwell |
| 6,710,790 B1 | 3/2004 | Fagioli |
| 6,970,098 B1 | 11/2005 | Adams et al. |
| 2002/0002707 A1 | 1/2002 | Ekel et al. |
| 2002/0045484 A1 | 4/2002 | Eck et al. |
| 2002/0059588 A1 | 5/2002 | Huber et al. |
| 2002/0073416 A1 | 6/2002 | Ramsey Catan |
| 2002/0092025 A1 | 7/2002 | Klumpp |
| 2002/0158812 A1 | 10/2002 | Pallakoff |
| 2003/0188322 A1* | 10/2003 | Bontempi ................ 725/139 |
| 2003/0228883 A1 | 12/2003 | Kusakari et al. |
| 2004/0024638 A1 | 2/2004 | Restis |
| 2004/0087369 A1 | 5/2004 | Tanaka et al. |
| 2004/0110563 A1 | 6/2004 | Tanaka et al. |
| 2004/0176170 A1 | 9/2004 | Eck et al. |
| 2004/0224638 A1 | 11/2004 | Fadell et al. |
| 2005/0012723 A1 | 1/2005 | Pallakoff |
| 2005/0130744 A1 | 6/2005 | Eck et al. |
| 2005/0181877 A1 | 8/2005 | Kuwahara et al. |
| 2005/0197187 A1 | 9/2005 | Mitsuyoshi et al. |
| 2005/0282634 A1 | 12/2005 | Yamada et al. |
| 2005/0282639 A1 | 12/2005 | Tanaka et al. |
| 2006/0040638 A1 | 2/2006 | McQuaide |
| 2006/0041923 A1* | 2/2006 | McQuaide, Jr. ............. 725/131 |
| 2006/0079329 A1 | 4/2006 | Yamada et al. |
| 2006/0106963 A1 | 5/2006 | Sasaki et al. |
| 2006/0107281 A1 | 5/2006 | Dunton |
| 2006/0271791 A1 | 11/2006 | Novack et al. |
| 2006/0282572 A1 | 12/2006 | Steinberg et al. |
| 2007/0011604 A1* | 1/2007 | Chiu ......................... 715/513 |
| 2007/0018845 A1* | 1/2007 | Sutardja ................ 340/825.69 |
| 2007/0121606 A1* | 5/2007 | Scheinert ................... 370/356 |
| 2007/0129106 A1* | 6/2007 | Liu ......................... 455/556.1 |

* cited by examiner

US 7,609,824 B2

TETHERED DIGITAL BUTLER CONSUMER ELECTRONIC DEVICE AND METHOD

RELATED APPLICATIONS

This application is a continuation of U.S. application Ser. No. 12/210,782 filed Sep. 15, 2008, which is a continuation of U.S. Pat. No. 7,444,130 filed Aug. 18, 2006, which is a continuation-in-part of and claims priority to U.S. Pat. No. 7,389,103 filed Feb. 8, 2006, which claims the benefit of and priority to U.S. Provisional Application No. 60/709,666 filed Aug. 19, 2005.

This application is related to US Design patent application Nos. 29/236,023, 29/236,022 and 29/236,022, filed on Aug. 10, 2005 by inventors Phoebe Ng, Robert Stepanian and Allison S. Conner, entitled, "NAVIGATION BUTTON ARRAY FOR REMOTE CONTROL HOUSING", "REMOTE CONTROL HOUSING" and "CONSOLE HOUSING". The priority, provisional and related design applications are incorporated by reference.

BACKGROUND OF THE INVENTION

The present invention relates to a tethered digital butler consumer electronics product and method. The tethered digital butler, of a price and form factor suitable for consumer electronics markets of developed and developing countries, includes a communications and multi-media console and a wireless remote. The remote may resemble a handheld personal computer (HPC), a palm-held personal computer (PPC or PDA) or a smart phone, but has a low cost and feature set supported by the console that is novel in the consumer electronics market. In particular, this disclosure relates to combining telephone service, device control and, optionally, a fingerprint reader for easy user identification/authorization and personalization. The remote may be packaged separately from a console and sold to interact with capabilities of a communications and multi-media console from a different source, such as one running on a Windows, OS X or Linux platform.

Convergence of digital devices is not unbounded, because it is guided by market realities. Many concepts are floated as trial balloons that burst, never to see an enabling development effort or a reduction to practice. Some convergence trends are strong and noteworthy. Cellular smartphones or business phones such as Treo or Blackberry products are becoming powerful and supplanting separate PDAs. These smartphones go with the user across a cellular network and even overseas. They are untethered, packing many features into a small form factor, not requiring a console. Another trend is to repackage a PC as media center, complete with a wireless keyboard. Recent announcements suggest interfacing a Microsoft media center with a Bluetooth-equipped cellular telephone to use the sound reproduction of a TV as a sort of speaker phone, relying on the cellular telephone for network connectivity. In both instances, the telephone features are untethered from and do not depend on availability of a console.

For developing countries and cost-conscious buyers, the Treo and media center approaches are over-built and too expensive. An opportunity arises to provide a low-cost integrated consumer electronics system that includes a novel feature set and a cost-effective allocation of technical tasks between a remote and a console.

SUMMARY OF THE INVENTION

The present invention relates to a tethered digital butler consumer electronics product and method. The tethered digital butler, of a price and form factor suitable for consumer electronics markets of developed and developing countries, includes a communications and multi-media console and a wireless remote. The remote may resemble a handheld personal computer (HPC), a palm-held personal computer (PPC or PDA) or a smart phone, but has a low cost and feature set supported by the console that is novel in the consumer electronics market. In particular, this disclosure relates to combining telephone service, device control and, optionally, a fingerprint reader for easy user identification/authorization and personalization. As another option, a camera can be incorporated into the remote, thereby enabling video conferencing and other visual features. Alternatively, the remote may be packaged separately from a console and sold to interact with capabilities of a communications and console, set-top box, multi-media PC or other consumer electronics device from a different source, such as one running on a Windows, OS X or Linux platform, with or without telephone capabilities. The remote may include a media reader and remote USB port. Particular aspects of the present invention are described in the claims, specification and drawings.

Figure 2:
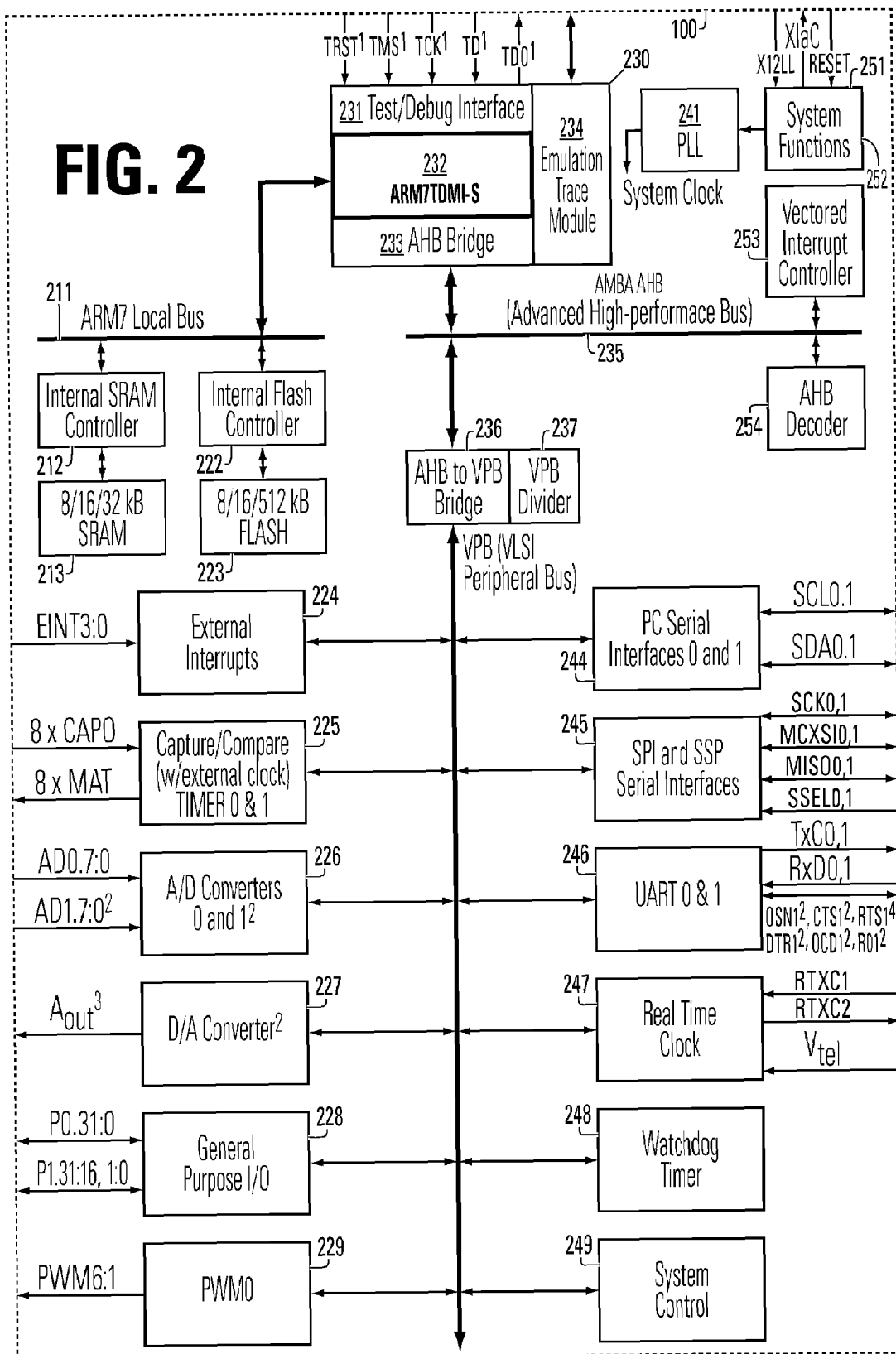

Details of the main processor are depicted in FIG. 2.

Figure 3:
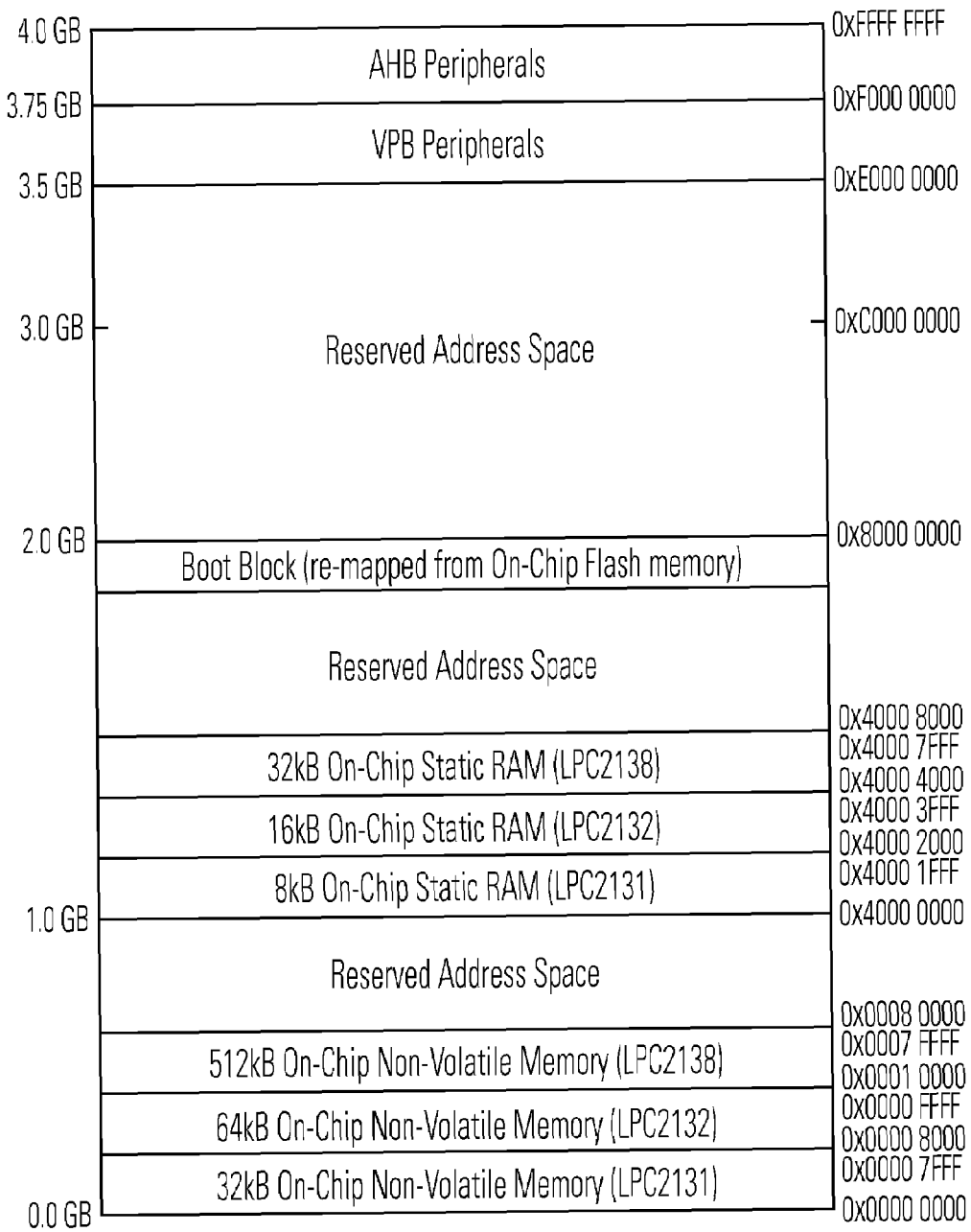

The LPC 2132 memory maps are shown in FIG. 3.

Figure 4:
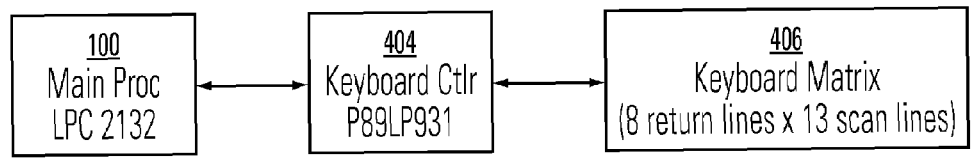

FIG. 4 shows the 8051 based Philips LPC89LPC931 controller.

Figure 5:
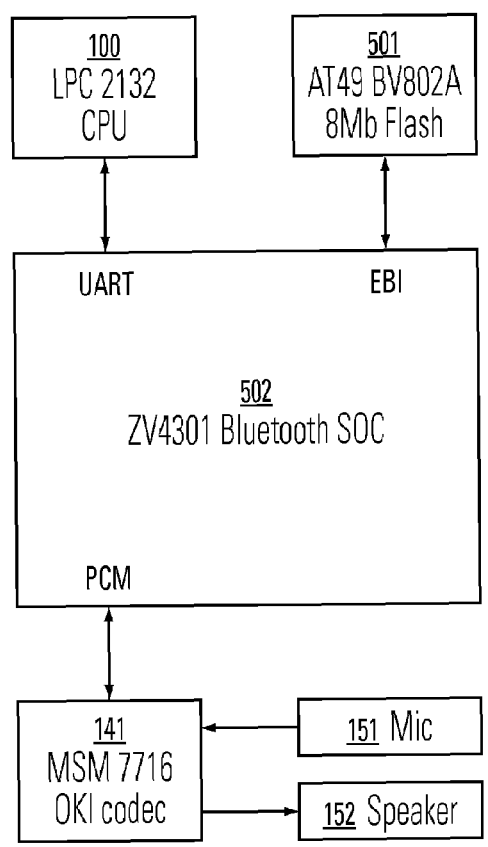

FIG. 5 shows the ZV4301 to other CPU and peripheral interfaces.

Figure 6:
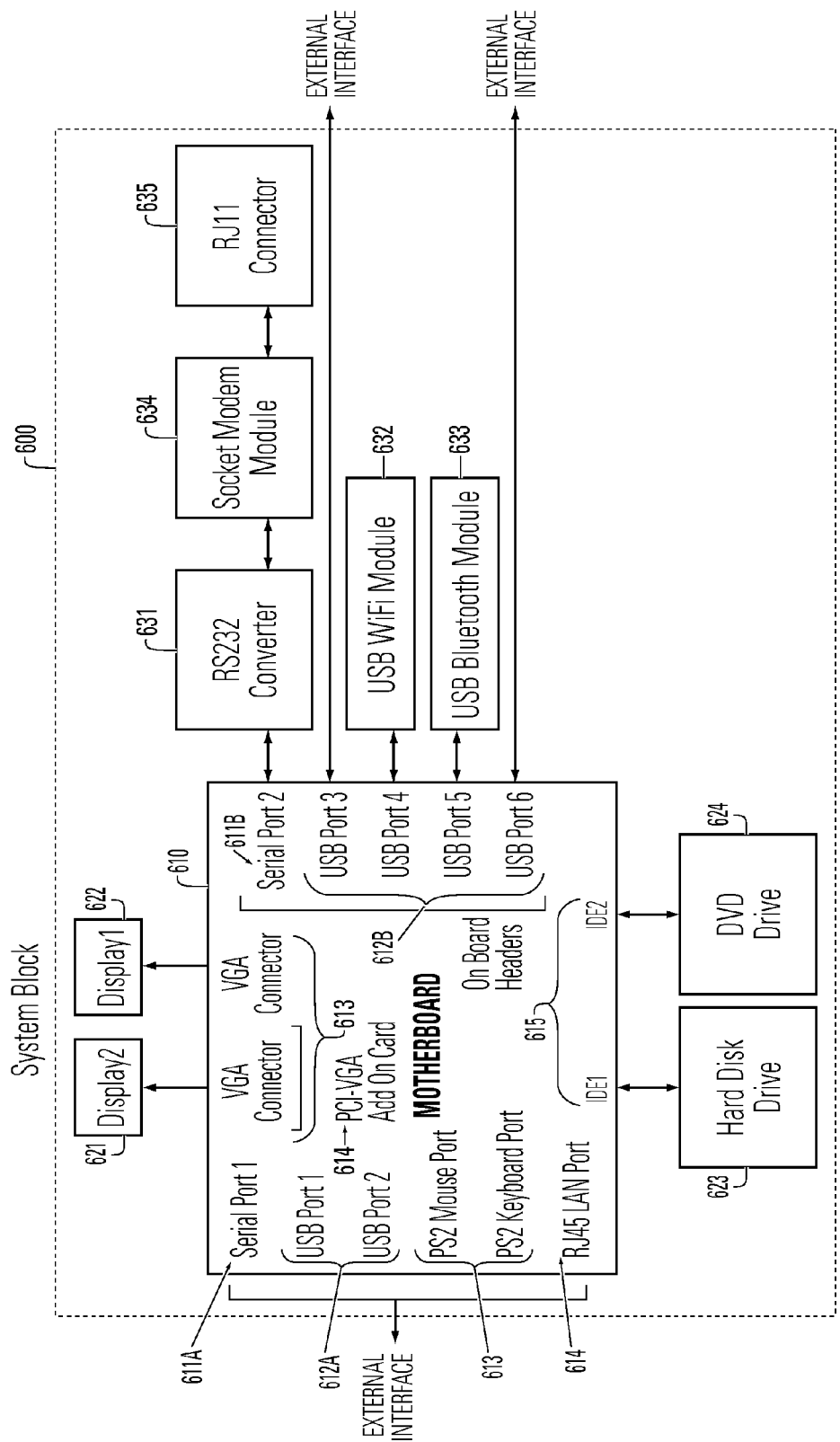

FIG. 6 is a block diagram of the console.

Figure 7:
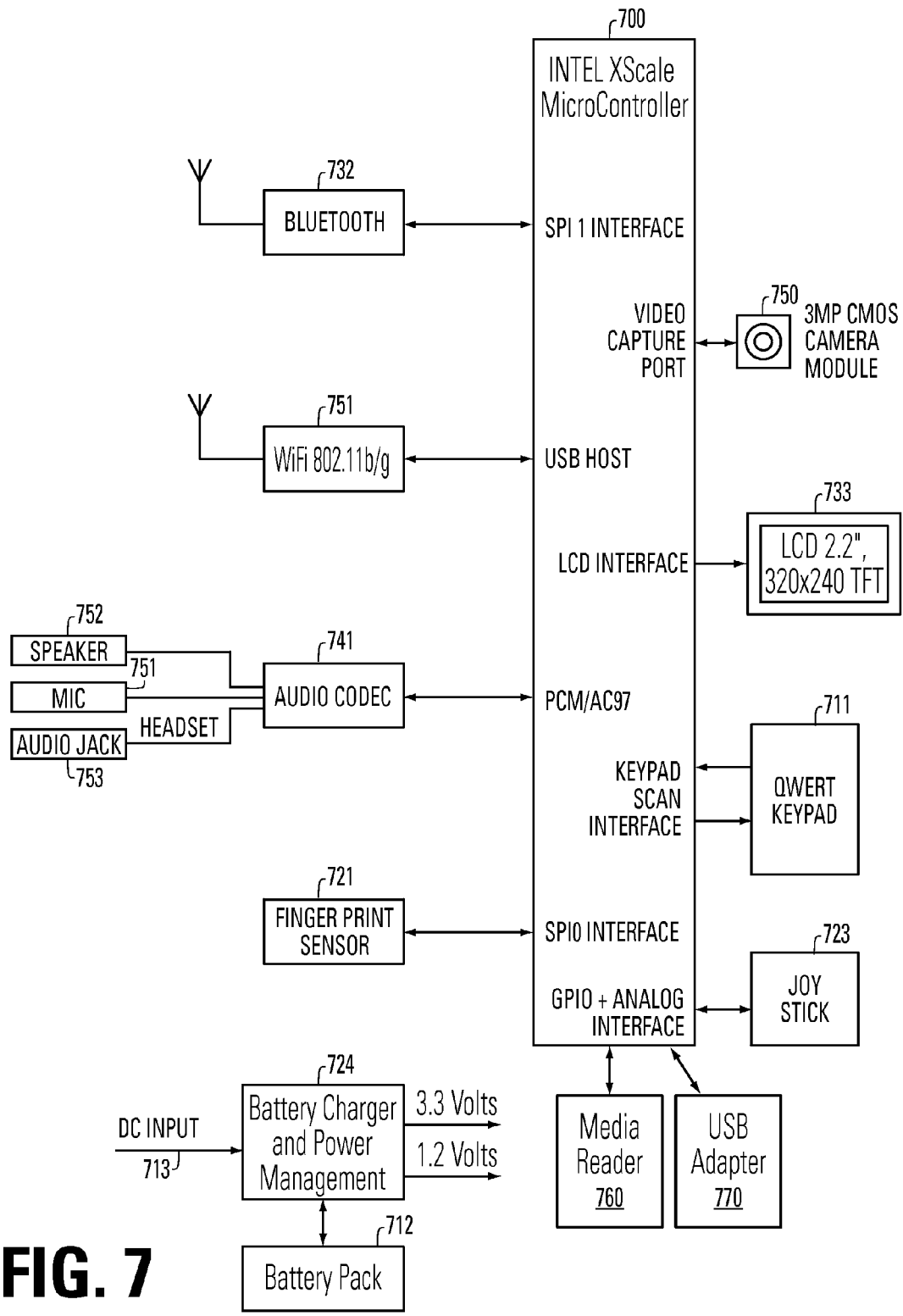

FIG. 7 is an alternative block diagram of the digital butler remote, with a CMOS camera module and/or memory card reader.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

A tethered digital butler produces a low cost, palm-held remote with a novel combination of features that are implemented by logic and resources of the console, connected wirelessly to the palm-held remote. Tethering the palm-held device, so that it depends on logic and resources of the console, runs against the trends and teachings of the consumer electronics industry and particularly against the trend toward more powerful smartphones.

Various novel combinations of features are emphasized in this application. One will recognize that the features discussed can be combined in many ways, while remaining faithful to the tethered digital butler concept.

In a first embodiment of the tethered digital butler, the palm-held remote allows a user to select among and use logic and resources of a bread-box or smaller sized console to authenticate users from a fingerprint reader on the remote, to personalize the user's telephone, TV viewing, media access and internet browsing experiences, to connect the user to a telephone network consistent with the user's authentication, and to control multi-media features, such as channel control, volume control, DVD/CD playback control, and digitally stored music access and playback. In this embodiment, the palm-held remote integrates at least a fingerprint reader, a speaker, microphone and volume control adapted for use as a telephone, a display at least capable of showing a telephone number, a cursor control and trigger adapted to select and control resources of the console, a compact keypad including numeric keys usable for telephone dialing, the compact keypad further including alphabetic keys usable for web browsing. The bread-box or smaller sized console integrates at least a DVD/CD player, a network port and logic and resources adapted to authenticate users of the palm-held remote and personalize their telephone network connection and their Internet browsing based on fingerprints received from the palm-held remote, connect telephone features of the palm-held remote to the telephone network, respond to Internet browsing commands from the palm-held remote and display web pages on a monitor or television, control channels accessed by a video receiver, drive speakers and provide volume control, provide playback control for the DVD/CD player, and access and playback digitally stored music.

In a second embodiment of the tethered digital butler, the palm-held remote has fewer components; the console supports fewer features; thus, the combination will be less expensive and more attractive in many markets. Remote components then include a speaker, microphone and volume control adapted for use as a telephone, a display at least capable of showing a telephone number, a cursor control and trigger adapted to select and control resources of the console, and a compact keypad including numeric keys usable for telephone dialing. The fingerprint reader is not included, nor is the alphabetic keypad. The logic and resources of the console are reduced accordingly. Logic and resources of the console need not authenticate and personalize based on fingerprints or access and playback digitally stored music. Internet browsing may be limited or may be supported by an on-screen keyboard.

In a third embodiment of the tethered digital butler, the DVD/CD player is omitted from the console. The features of the palm-held remote do not much change, but the logic and resources required of the console are reduced.

In fourth embodiment, the console is implemented on a PC, which may be larger than bread-box sized. This typically would be less desirable, as most PCs do not fit a media room décor and are relatively loud, due to fans and hard disk rotation. A new generation of PCs, such as the Mac Mini, presents a small form factor (presently 6.5×6.5×2 inches) and quiet operation, while including enough computing power to function as PC.

In a fifth embodiment, the remote is emphasized. One aspect of the remote is to provide a complete I/O platform in the palm of the user's hand. Features adaptable to VoIP and/or video phone operation, such as a microphone, can be used for other purposes, such as dictation, note taking, voice messaging, listening to music or remote viewing video. To support the high demands of streaming video, a broader communications channel, such as Bluetooth version 2 or later or 802.11n, and a more powerful processor are included. The remote may function in tandem with a console, PC or set top cable or satellite box. It also could be configured to control other consumer electronics device such as a TV, IP-TV, home theater system, component stereo, digital video recorder, DVD player or recorder, VCR, etc. It can receive streaming media directly from a server. The palm-held remote may be combined with a glue logic application that enables a console, PC, set top box or other consumer electronics device to utilize the special purpose controls of the remote. The remote may be adapted to invoke a glue logic application supplied for or native to a communications and/or multi-media console, such as one running under Windows, OS X or Linux.

In a sixth embodiment, a remote control for a gateway device t is coupled to multimedia and communication resources. The gateway device including logic and resources to process wireless input and provide access to the multimedia and communication resources. The remote control includes a palm-held remote adapted to invoke glue logic running on the gateway device by wirelessly directing input to the gateway device. It integrates at least a speaker and volume control adapted for use as a remote speaker, a fingerprint reader and a cursor control and trigger adapted to select and control resources of the console. Glue logic invoked wirelessly by the remote control is adapted to connect the speaker to a sound reproduction module and connect the fingerprint reader to an authentication and personalization module that selects a user profile based on activation of the fingerprint reader and authentication of the user. The personalization module adapted to present the user's personalized favorite media access, present the user's personalized history lists, automatically authenticate the user for digital rights management, automatically authenticate the user for communication access, and automatically authenticate the user for electronic wallet reproduction of purchasing credentials.

An alternative to video operation of a camera is still operation of the camera. The still camera may be wirelessly coupled to a photographic capture module running on another device, which persists the pictures taken. The persistence at the other device can simplify the remote and reduce its cost, as only temporary buffering in the remote is needed.

An aspect of this disclosure that can be combined with any of the foregoing embodiments is remote on-screen menu and controls display, translating a device menu and controls display that would normally appear on a TV or monitor for reproduction on a display that is part of the remote. To implement this capability, a menu-generating device can assemble on-screen menus and controls as separate data stream, apart from any video image that the menus and controls overlay. The data stream can be supplied both to the device's own on-screen overlay generator and to a communications module coupled to the remote. The remote uses the data stream to render the on-screen display in a legible format, adapted to the reduced size of a screen on the remote. Preferably, the menu and control organization format on the remote mimics what the viewer can see on the screen, to minimize confusion. Technologies such as a subset of HTML and JavaScript allow a designer to specify a menu and control layout in terms that permit rendering to a variety of display sizes. Remote display of the on-screen menu and control data stream may preempt a video image display or may be overlaid on top of the video image. Optionally, the device's on-screen menu and controls can be supplied to the remote exclusively as a data stream and not as part of a rendered video stream, to avoid confusing menus of different sizes. Alternatively, the on-screen menus and controls may just appear on the remote's display as a consequence of being rendered to a TV or monitor that is reproduced on the remote's display.

In any of these embodiments, a camera module can be incorporated into the remote, thereby enabling video conferencing and other visual features. The camera is complemented by a glue logic application supplied for or native to a communications and/or multi-media console, such as one running under Windows, OS X or Linux. To support full motion video, Bluetooth version 2 or later or a wireless Ethernet protocol may be used to supply the required bandwidth.

As a further aspect of these embodiments, the console may be equipped with a non-volatile memory sized to time-shift playback from the video receiver and its logic and resources are further adapted to provide a menu of upcoming video content, schedule recording of the video content and replay the video content. Alternatively, the non-volatile memory may be sized to hold a library of digital music.

The I/O platform in the palm of our hand concept can be enhanced by adding a memory card reader to the remote. One or more of the many memory card formats now in use or as may be developed in the future can be accommodated.

Another form of I/O is provided through a USB or Firewire port. The remote may integrate a USB connector and port or similar Firewire support. Glue logic running on the host device may be adapted to treat the USB or Firewire port as if it were local to a machine being accessed using the remote.

In another aspect of these embodiments, the remote may hold a DRM key and automatically deliver the key to DRM-enabled device. Either memory on the remote, a memory module or an identification reader combined with the remote may hold the DRM key. The identification reader can read a smart card or similar module with memory or can read a fingerprint in order to authorize automatic use of the DRM key to exercise DRM-evidenced rights. When a user visits a neighbor's console, they may take along their hand-held remote and the associated digital rights for use on the neighbor's console or other device.

Another feature that can be combined with any of these embodiments is personalization based on a single action, a swipe of the fingerprint reader. Coupled wirelessly to the fingerprint sensor software is a personalization module. If a user does not identify himself by swiping the fingerprint sensor, then a generic profile is applied to personalization of music, movies, photos, videos, files and telephone access. If the user swipes the fingerprint sensor, then personalization can be applied, analogous to switching users in current Windows XP implementations. This degree of context shifting based on a single action at a remote control is believed to be new and unique. The personalization may include: favorite channels/movies/shows in a streaming video environment; favorite music, photos or video in an on demand environment; approved access to DRM-controlled content using one or more keys linked to the fingerprint; history of searches, recent topics, personal interest (a la Google Sidebar or Claria PersonalWeb), personal receptiveness to advertising content, recently accessed files; automatic authenticated access to communication channels linked to the fingerprint, such as voice over IP, instant messaging, web conferencing and e-mail; electronic wallet access, automatically looking up credit card information and other account authorization information; and sharing of information by person logged in.

The console may be equipped with a remote locator control button that causes the remote to emit a tone which makes it easier to locate.

The form factor of a palm-held remote should be easily recognized.

The form factor of a bread-box or smaller sized console can be judged by volume. A smallish consumer electronics component uses an enclosure (from which connectors and feet protrude) that is 12 by 15 by 3 inches and has a volume of 540 cubic inches. This is an approximately bread-box sized enclosure, although the shape differs from a loaf of bread.

Remote Hardware
  Introduction

The digital butler remote is a gadget based on the Bluetooth or another wireless technology used for communications and remote control applications.

Features

The digital butler remote board is an ARM7 processor based solution. This remote is built around the Philips LPC2132 ARM controller. The main processor provides interfaces for the Keypad, Trackball or other pointing device, 128*32 graphics LCD module, fingerprint sensor, and Bluetooth SOC. The Bluetooth SOC and Zeevo ZV4301 interface with a microphone, speaker and headphone for voice utilities. The system may use a Philips 89LPC931 controller for the keypad interface through a 12C Bus. Alternative hardware configurations are illustrated in FIGS. 7 and 8.

Figure 1:
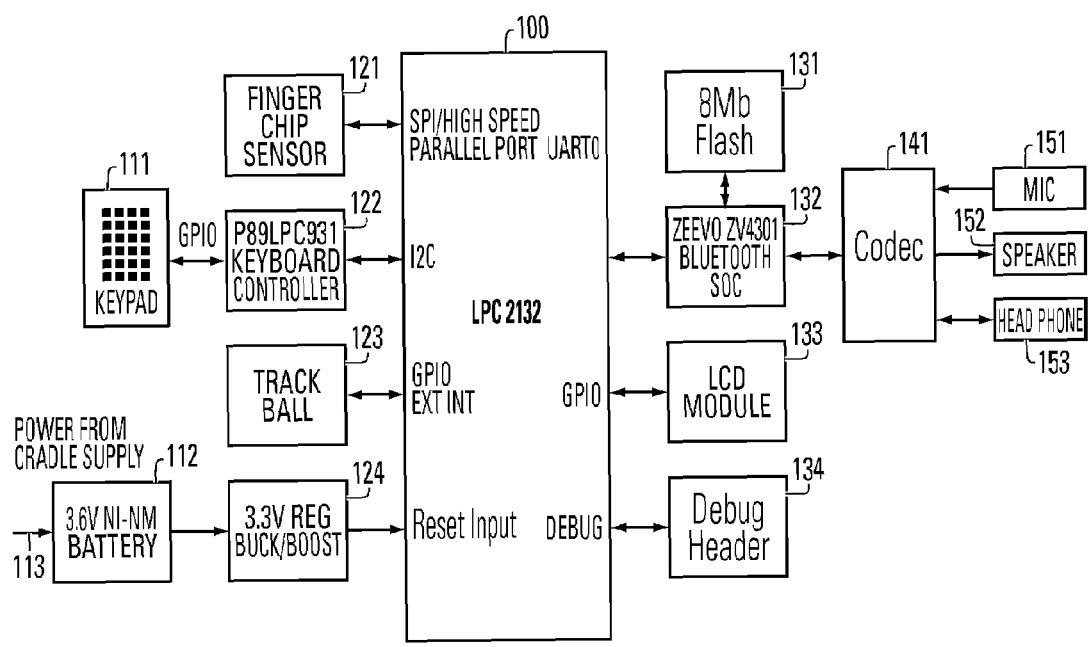
FIG. 1 is a block diagram of the digital butler remote.

FIG. 1 is a block diagram of the digital butler remote.

Embodiment Details

| Chip Name | Chip number | Description |
| --- | --- | --- |
| Main processor (100) | LPC2132, Philips. | Main CPU, 60 MHz/64 Kb flash/16 Kb SRAM |
| Keypad controller (122) | 89LPC931, Philips. | 8051 MCU compatible with 8 KB flash, 12C interface. |
| LCD Display module (133) | DDG128032AAD, DDTL. | 128*32 graphics parallel/serial LCD Module. |
| TrackBall (123) | TBWB2A00, ITT Industries, Cannon; Omni- or Vari-Point or Omni- or Vari-Disk devices, ITT Industries, Cannon. | Miniature all directional scanning switch. |
| Fingertip sensor (121) | AES3400, Authentech. | Fingertip sensor with SPI interfaces. |
| Bluetooth SOC (132)) | ZV4301, Zeevo or equivalent by Broadcom or RSMD. | Bluetooth SOC with, UART interface. |
| Flash Memory (131) | AT49BV802A, Atmel. | Bluetooth SOC Flash, 8 Mb |
| Codec IC (141) | MSM7716, OKI. | Single rail codec. |
| Power Supply (113) | LTC 3440EDD - Linear Technology. | Micro power synchronous 600 ma Buck-Boost Dc-DC converter |

Additional details of the main processor are depicted in FIG. 2. The LPC2132 (100) is based on a 32/16-bit ARM7TDM1-S CPU (232) with real time emulation and embedded trace support, together with 64 Kbytes (KB) of embedded high speed flash memory (223). A 128 bit wide memory interface (211, 212, 222) and accelerator architecture enable 32 bit code execution at maximum clock rate. For critical code size applications, an alternate 16 bit "thumb mode" reduces code by more then 30% with minimal performance penalty. Due to their tiny size and low power consumption, these micro controllers are typically used for miniaturized applications, such as hand-held equipment. Most peripheral pins can also be remapped as General Purpose I/O pins. The system includes on-chip SRAM of 16 KB (213) and is well suited for communication gateways and protocol converters, soft modems, voice recognition and low end managing, providing both large buffer size and high processing power. Various 32-bit timers (247, 248), 10-bit 8 channel ADC(s) (226), 10-bit DAC (227), PWM channels (225) and 47 GPIO lines (228) with up to nine edge or level sensitive external interrupt pins, make these microcontrollers particularly suitable for industrial control and hand-held systems.

The integrated ARM microprocessor operates at 60 MHz and, in one embodiment, supports the following features:
  16/32-bit ARM7TDM1-S microcontroller (232) in a tiny LQFP64 package.8/16/32 KB of on-chip static RAM (213) and 64/512 KB of on-chip Flash program memory (223). A 128 bit wide interface/accelerator (211, 212, 222) enables high speed 60 MHz operation.
  In-System/In-Application Programming (ISP/IAP) via on-chip boot-loader software. Single Flash sector or full chip erase in 400 ms and programming of 256 bytes in 1

Ms. Embedded Trace interfaces (231) offer real-time debugging with the on-chip real monitor software and high speed tracing of instruction execution. One 8 channel 10-bit A/D converters (226) provides a total of up to 16 analog inputs, with conversion times as low as 244 µs per channel.

Single 10-bit D/A converter (227) provides variable analog output.

Two 32-bit timers/counters (with four capture and four compare channels each)(225), PWM unit (six outputs) (225) and watchdog (248).

Real-time clock (247) equipped with independent power and clock supply permitting extremely low power consumption in power-save modes. Multiple serial interfaces including two UART (16C550) (246), two Fast I2C-bus (400 Kb/s) (244), SPI and SSP (245) with buffering and variable data length capabilities.

Vectored interrupt controller (253) with configurable priorities and vector addresses.

Up to 47 5 V tolerant general purpose I/O pins (228) in tiny LQFP64 package.

Up to nine edge or level sensitive external interrupt pins (224) available.

60 MHz maximum CPU clock available from programmable on-chip PLL (241).

On-chip crystal oscillator with an operating range of 1 MHz to 30 MHz.

Power saving modes include idle and Power-down.

Individual enable/disable of peripheral functions as well as peripheral clock scaling down for additional power optimization.

Processor wake-up from Power-down mode via external interrupt (224).

Single power supply chip with POR and BOD circuits.

CPU operating voltage range of 3.0 V to 36 V (33 V±10%) with 5 V tolerant I/O pads.

The LPC 2132's 64 KB of flash memory (223) may be used for both code and data storage. Programming of the flash memory may be accomplished in several ways. It may be programmed in the system via the serial port (245). The application program may also erase and/or program the flash while the application is running, allowing flexibility for data storage field firm grade upgrades, etc. While the on chip boot loader is used, 64 KB flash memory is available for user code. The LPC2132 flash memory provides a minimum of 100,000 erase/write cycles and 20 years of data retention. On-chip static RAM (213) may be used for code and/or data storage. The SRAM may be accessed as 8 bits, 16 bits or 32 bits wide. General purpose parallel I/O is supported by device pins that are connected to a specific peripheral function are controlled by the GPIO registers. Pins may be dynamically configured as inputs or outputs. Separate registers allow setting or clearing any number of outputs simultaneously. The value of the output register may be read back, as well as the current state of the port pins. The GPIO lines have the following features.

Direction control of individual bits.

Separate control of output set and clear.

All I/O default to inputs after reset.

The LPC 2132 memory maps shown in FIG. 3 incorporate several distinct regions. In addition, the CPU interrupt vectors may be re-mapped to allow them to reside in either Flash memory (by default) or on-chip static RAM.

The vectored interrupt controller (VIC) accepts all of the interrupt request inputs and categorizes them as FIQ, vectored IRQ, and non vectored IRQ as defined by programmable setting. The programmable assignment scheme means that priorities of interrupts from the various peripherals can be dynamically assigned and adjusted.

Fast interrupt request (FIQ) has the highest priority. If more than one request is assigned to FIQ, the VIC combines the requests to produce the FIQ signal to the ARM processor. The fastest possible FIQ latency is achieved when only one request is classified as FIQ, because then the FIQ service routine can simply start dealing with that device. But if more than one request is assigned to the FIQ class, the FIQ services routine can read a word from the VIC that identifies an FIQ source that is requesting an interrupt. Vectored IRAs have middle priority. Sixteen of the interrupts can be assigned to this category. Any of the interrupt requests can be assigned to any of the 16 vectored IRQ slots, among which slot 0 has the highest priority and slot 15 has the lowest. Non-vectored IRQ's have the lowest priority.

The VIC combines the requests from all the vectored and non-vectored IRAs to produce the IRQ signal to the ARM processor. The IRQ service routine can start by reading the register from the VIC and jumping there. If any of the vectored IRAs are requested, the VIC provides the address of the highest-priority requesting IRAs service routine, otherwise it provides the address of a default routine that is shared by all the non vectored IRAs. The default routine can read another VIC register to see what IRAs are active.

The LPC 2132 contains two UARTs (246). One UART provides a full modem control handshake interface, the other provides only transmit and receive data lines. The features of UART is listed below:

16 byte, receive and transmit FIFO s.

Register locations conform to '550' industry standard.

Receiver, FIFO trigger points at 1, 4, 8, and 14 bytes.

Built in baud rate generator.

Standard modem interface signals included on UART 1.

I2C (244) is a bi-directional bus for inter IC control using only two wires, a serial clock line (SCL) and a serial data line (SDA). Each device is recognized by a unique address and can operate as either a receiver only device or a transmitter with the capability both to receive and send information.

Transmitters and/or receivers can operate in either master or slave mode, depending on whether the chip has to initiate a data transfer or is only addressed. I2C is a multi-master bus that can be controlled by more than one bus master connected to it.

I2C implemented in LPC2132 support bit rate up to 400 kbit/s (Fast I2C). The features of LPC2132 I2C bus is listed below:

Standard I2C compliant bus interface.

Easy to configure as master, slave, or line-select master or slave.

Programming clocks allow versatile rate control.

Bi-directional data transfer between masters and slaves.

Multi master bus (no center master)

Arbitration between simultaneously transmitting masters without corruption of serial data on the bus.

Serial clock synchronization allows devices with different bit rates to communicate via one serial bus.

Serial clock synchronization can be used as a hand shack mechanism to suspend and resume serial transfer.

The I2C bus may be used for test diagnostics purposes.

The SPI (245) is a full duplex serial I/O interface, designed to be able to handle multiple masters and slaves connected to a given bus. A single master and a single slave communicate on the interface during a given data transfer. During a data transfer, the master always sends a byte of data to the slave, and the slave always sends a byte of data to the master. The features of the SPI controller is listed below:

Compliant with serial peripheral interface (SPI) specification.

Synchronous, serial, full duplex, communication.

Combined SPI master and slave.

Maximum data bit rate of one eighth of the input clock rate.

The real time clock (RTC) (247) is designed to provide a set of counters to measure time when normal or ideal operating mode is selected. The RTC uses little power, making it suitable for battery powered systems where the CPU is not running continuously (idle mode). The features of RTC are described below.

Measures the passage of time to maintain a calendar and clock.

Ultra low power design to support battery powered systems.

Provides seconds, minutes, hours, day, month, year, day of week, and the day of year.

Programmable reference clock divider allows adjustment of the RTC to match various crystal frequencies.

The 8051 based Philips LPC89LPC931 controller in FIG. 4 is suitable for keyboard interface. The P89LPC930/931 (404) is based on a high performance processor architecture that executes instructions in two to four clocks, six times the rate of standard 80C51 devices. Many system-level functions have been incorporated into the P89LPC930/931 in order to reduce component count, board space, and system cost. The P89LPC931 has the following enhanced features:

A high performance ARM processor 80C51 CPU provides instruction cycle times of 111 ns to 222 ns for instructions except multiply and divide, when executing at 18 MHz. This is six times the performance of the standard 80C51 running at the same clock frequency. A lower clock frequency for the same performance results in power savings and reduced EMI.

2.4 V to 3.6 V VDD operating range. I/O pins are 5 V tolerant.

8 kB flash code memory with 1 kB sectors, and 64-byte page size.

Byte-erase allowing code memory to be used for data storage.

Flash program operation completes in 2 ms.

256-byte RAM data memory.

Real-time clock that can also be used as a system timer.

Enhanced UART with fractional baud rate generator, break detect, framing error detection, automatic address detection and versatile interrupt capabilities.

400 kHz byte-wide I2C-bus communication port.

Eight keypad interrupt inputs, plus two additional external interrupt inputs.

Four interrupt priority levels.

On-chip power-on reset allows operation without external reset components. A reset counter and reset glitch suppression circuitry prevent spurious and incomplete resets. A software reset function is also available.

The keypad 8*13 matrix (406) is connected to the GPIO lines of P89LPC931 micro controller (404). The keypad has 8 return lines and 13 scan lines. The return lines are connected to the keyboard port of the P89LPC931 micro controller. The P89LPC931 is connected to the main processor LPC2132 through the I2C bus to minimize the number of pins on the main processor.

The custom software is loaded into the flash program memory of the P89LPC931 micro controller which scans the keypad and generates ASCII codes and communicates to the main processor through the I2C bus. The P89LPC931 micro controller is normally kept in power save mode, and it will awaken in response to keyboard interrupts after the key press.

The keyboard port of P89LPC931 has a change on status interrupt feature, and hence any key press will generate the keyboard interrupt. The key bounces are taken care of by the software.

The QWERTY keyboard may have a Chinese character entry feature and the software transfers the Chinese corresponding ASCII codes to the main processor in Chinese key entry mode.

The following tables describe interfaces among the CPU (100), keyboard controller (404) and matrix (406):

| Keyboard Controller to CPU Interface | | | |
|---|---|---|---|
| Signal | LPC2132 | P89LPC93 | Remarks |
| Serial I2C Data | SDA | SDA | I2C interface |
| Serial I2C clock | SCL | SCL | I2C interface |

| Keyboard Controller to Matrix Interface | | | |
|---|---|---|---|
| Signal | P89LPC93 Signal Name | key board | Remarks |
| K13I.0 Keybd input 1 | P0.0 | RET LINE 1 | Keybd Return line 1 |
| KBI.1 Keybd input 2 | P0.1 | RET LINE 2 | Keybd Return line 2 |
| K13I.2 Keybd input 3 | P0.2 | RET LINE 3 | Keybd Return line 3 |
| K13I.3 Keybd input 4 | P0.3 | RET LINE 4 | Keybd Return line 4 |
| KBIA Keybd input 5 | P0.4 | RET LINE 5 | Keybd Return line 5 |
| K13I.5 Keybd input 6 | P0.5 | RET LINE 6 | Keybd Return line 6 |
| K13I.6 Keybd input 7 | P0.6 | RET LINE 7 | Keybd Return line 7 |
| K13I.7 Keybd input 8 | P0.7 | RET LINE 8 | Keybd Return line 8 |
| K130.0 Keybd output 1 | P2.0 | SCAN LINE 1 | Keybd Scan line 1 |
| K130.1 Keybd output 2 | P2.1 | SCAN LINE 2 | Keybd Scan line 2 |
| K130.2 Keybd output 3 | P2.2 | SCAN LINE 3 | Keybd Scan line 3 |
| K130.3 Keybd output 4 | P2.3 | SCAN LINE 4 | Keybd Scan line 4 |
| KBOA Keybd output 5 | P2.4 | SCAN LINE 5 | Keybd Scan line 5 |
| K130.5 Keybd output 6 | P2.5 | SCAN LINE 6 | Keybd Scan line 6 |
| K130.6 Keybd output 7 | P2.6 | SCAN LINE 7 | Keybd Scan line 7 |
| K130.7 Keybd output 8 | P2.7 | SCAN LINE 8 | Keybd Scan line 8 |
| K130.8 Keybd output 9 | P1.0 | SCAN LINE 9 | Keybd Scan line 9 |
| K130.9 Keybd output 10 | P1.1 | SCAN LINE 10 | Keybd Scan line 10 |
| K130.10 Keybd output 11 | P1.4 | SCAN LINE 11 | Keybd Scan line 11 |
| K130.11 Keybd output 12 | P1.6 | SCAN LINE 12 | Keybd Scan line 12 |
| K130.12 Keybd output 13 | P1.7 | SCAN LINE 13 | Keybd Scan line 13 |

The LCD display (133) DD12803AAD, in one embodiment, is a 128*32 dot matrix LCD module. The LCD Module can be easily accessed via parallel micro controller GPIO interface. Its features include:

Transflective display mode and positive type, B/W mode, FSTN LCD.

Graphic 128*32 dot-matrix display format.

Parallel input data from micro controller.

1/33 duty multiplexing ratio.

1/16 bias.

6 o'clock viewing direction.

Dimension outline 35(W)*28.9(H)*1.75(D) mm.

Resolution 128*32 dots.

Active area 29.66(W)*8.45(W) mm.

Dots pitch 0.232(W)*0.265(H) mm.

Dots size 0.202(W)*0.235(H) mm.

The ITT Industries, Cannon TBWB2A00 trackball (123) is a miniature all directional scanning switch developed for mobile, remote, PDA, notebook PC, and hand-held device applications. It includes two perpendicular rollers actuated by friction on the ball and two spring contacts which generate (by contact closing and opening) the electrical pulses and a light tactile effect (click) at each pulse. A switch called "Select" is integrated in the trackball. Optimally, two LEDs can be included with the trackball and driven according to the wishes of the user. Several tactile effects can be obtained according to the number of tooth integrated in the gear axle; the standard resolution is 12 pulses per ball rotation. When the Trackball is activated, its relative position changes are analyzed in two directions X and Y. The two perpendicular rollers are actuated by friction on the ball. During their revolution, the rollers activate two spring contacts which generate (by contact closing and opening) the electrical pulses.

To track the ball movements, a simple electronic device tied to the direction contacts converts the vertical and horizontal displacements of the both perpendicular rollers in logical levels of X-axis and Y-axis displacements: Some pull-up resistors (or respectively pull down resistors) are tied to the axis direction contacts while the common contact is tied to the ground (or respectively to the power supply potential). The change in state interrupts the main LPC2132 processor (100). The output pulse frequency is directly proportional to the moving speed and the direction. The pulse frequency is processed by the main processor LPC2132 and the corresponding PS2 data sent to the host system.

Alternatively, the ITT Industries, Cannon Omni- or Vari-Point joystick or the Omni- or Vari-Disk navigation disk can be used instead of a trackball.

The AuthenTec EntrePad, AES3400, AuthenTec's 3rd generation low power, small form-factor fingerprint identification sensor IC (121). This product combines silicon-based image capture with a proprietary sensor control and matching algorithms to deliver ability-to-acquire (ATA) fingerprint images and authentication. AuthenTec's EntrePad AES3400 utilizes TruePrint Technology, allowing the sensor to look past the easily obscured outer surface of the skin to the living layer below where the unique ridge and valley patterns of the fingerprint originate. Trueprint is AuthenTec's unique patented imaging technology. During imaging, a small near-field signal is generated between the IC and the finger's living tissue layer. 16,384 individual elements in the sensor matrix form a planar antenna array that receives this signal, creating a digital pattern that accurately reproduces the fingerprint's underlying structure. A powerful utility within TruePrint is Dynamic Optimization. This tool analyzes each image, controlling up to 15 sensor parameters to optimize the fingerprint image, regardless of unusual skin conditions or surface contamination. The TruePrint high-quality fingerprint imaging technology enables reliable authentication.

The fingerprint sensor is small, battery friendly and well-suited to Bluetooth communications. These sensors automatically generate interrupts and reduce system overhead needed for finger detection.

Features of the fingerprint component, in one embodiment, include:

TruePrint technology for ability to acquire (ATA)

Compact industry standard 100-Pin LQFP Package

High definition 128×128 TruePrint technology based pixel array 500 pixels per inch (ppi)

Extended Range 2.7V to 3.6V single power supply

0° C. to +70° C. operating temperature range

Easy to integrate USB 2.0 full speed, synchronous & asynchronous serial, & 8-bit parallel system interfaces 6 or 12 MHz operation with crystal or supplied clock input USB selective suspend support Ultra-hard surface coating 1 million rubs w/o degradation Highly scratch resistant IEC 61000-4-2 level 3 ESD capability (+/−8 KV)

Built-in low power finger detection w/system interrupt capability

Low power operation; <6 mW/imaging event.

The interface of these fingertip sensors is pin selectable choices. The SPI interface finger chip sensor is selected so that the finger tip sensor is connected to the SPI port (245) of the main processor.

The Zeevo ZV4301 in FIG. 5 used in one embodiment is a Bluetooth SOC adapted to provide a high bandwidth CPU system to add wireless connectivity to their product. The ZV 4301 (502) incorporates the industry standard 32 bit ARM7TDM1 CPU core with high bandwidth processing capability sufficient to support a wide range of embedded applications. The ZV4301 operates from −25C to 85C and comes in a lead free version. The ZV4301 is implemented in a 0.18 micro meter CMOS process and includes the integration of all RF components and digital circuitry. The only external components needed are an antenna, crystal, reference resister, decoupling capacitors, and flash memory. The ZV4301 is designed for low power applications including sleep and deep sleep modes, and operates from a single 3.3V supply. The ZV4301 is manufactured in an 8.6×8.6×1.65 mm LTCC BGA package with 100 balls.

The ZV4301 is supplied with a link library for a complete lower layer protocol stack and source code to the blueOS operating system, target manager and link manager API. Upper layers are supported through the Zeevo partner program with firmware, Bluetooth protocol stack software and Bluetooth profiles available from Zeevo's extensive partner list.

The Zeevo4301 typical application supports AV equipment, smart phones, personal digital assistants, printers, cellular peripherals, access points and industry controls. Features include:

Bluetooth 1.2 compliant.

High bandwidth ARM7TDM1 processor subsystem.

12, 24 and 48 MHz CPU clocks—selectable on chip PLL from single 12 MHz input.

Highly integrated low cost solution: Radio, link control and CPU are integrated.

High throughput.

Tested qualified software stack available.

Support for very low power modes—sleep and deep sleep.

Audio capability on an SCO channel.

On chip crystal tuning and power calibration.

Complete co-location and co-existence solutions with 802.11 supported through AWMA, AFH and SFH.

The CPU and memory support include:

ARM7TDMI processor core.

12 24 and 48 MHz operation.

32/16 bit RISC architecture, 32 bit ARM instruction.
16 bit Thumb instruction set for increased code density.
32 bit ALU and high performance multiplier.
Extensive debug facilities-JTAG.
8 K bytes of boot ROM.
64 K bytes of SRAM.
The radio features include:
Integrated RF interface connects directly to antenna.
Integrated power amplifier supports up to +4 dBm output power for class 2 & 3 operation.
High sensitive design (−86 dBm typically).
Class 1 operation is supported with an external power amplifier/LNA interface.
IF-enhanced direct conversion receiver architecture.
Integrated TX/Rx switch, balun, and matching network in an LTCC package.
Low power consumption receiver design.
Multiplexed RX/TX antenna interface.
Fully integrated PLL synthesizer and loop filter—requires external 12 MHZ crystal.
The baseband and software features include:
Required and optional Bluetooth 1.2 features faster connection, extended SCO link, adaptive frequency hopping (AFH), QOS, flow control.
Direct memory access (DMA) for low overhead UART control.
Standard Bluetooth HCI interface over UART and USB.
Support for a range of Bluetooth data rates (57.6-723 Kb/sec)
Support for multiple ACL and HC-SCO packet types.
Park, sniff, and hold modes.
Point-to-point, point-to-multipoint, and scatter net.
Up to 7 slaves and up to 4 Pico nets supported.
u-Law, A-Law and CVSD transcoders on SCO channel
Full 8- to 128 bit encryption.
The baseband modem includes:
Demodulator, modulator, RX/TX self calibration, burst timing control and transmitter burst spectral shaping.
FEC encoder/decoder, data whitening, encryption-decryption, and cyclic redundancy check.
Link controller for synchronization, frequency hope control, and receiver/transmitter slot timing.
The external bus interface includes:
8, 16-bit data bus.
23-bit address bus.
Support for 2 memory banks. Each bank supports up to 16 Mbytes flash and SRAM, with independent timing control for each bank.
GPIO can function as additional interrupts.
3 dedicated chip selects, each with independent timing control.
3 indicated interrupt lines.
The UART includes:
16450 register set compatible UART.
9600, 19.2K, 38.4K, 57.61K, 115.2K, 230.4K, 460.8K, and 921.6 Kbs UART baud rates.
RTS and CTS flow control signals for UART.
Direct Memory Access (DMA) for low overhead UART control.
The USB support includes:
USB version 2.0 compliant interface.
USB wakeup and detach sideband signals supported.
Direct Memory Access (DMA) for low overhead USB control.
The general purpose I/O features:
Sixteen individually programmable general purpose I/O.
Configurable for UART wake up hand shaking.
Base band and CPU activity indication.
USB/UART mode select.
Each GPIO can be used as interrupt.
The pulse code modulator support includes:
PCM interface for audio applications: PCM-OUT, PCM_IN, PCM_CLK, and
PCM SYNC.
Linear u-Law and A-Law codes supported.
Interface to OKI MSM 7732-01 and OKI 7716 codec.
Direct Memory Access (DMA) for low overhead PCM control
A 12 MHZ crystal serves as the primary clock crystal.
FIG. 5 shows the ZV4301 to other CPU and peripheral interfaces. The ZV4301 is interfaced with the main processor LPC2132 (100) through the UART port. The 8 Mb Flash memory AT49BV802A (501) is interfaced with ZV4301 through the external bus interface. The single rail linear codec (141) is interfaced with the ZV4301 through the PCM interface.
Debugging of the remote is supported by JTAG header and BDM header is used in the board for the debugging purposes. This section gives the details of the JTAG header and BDM header.
The processor complies with the IEEE 1149.1A JTAG testing standard. The JTAG test pins are multiplexed with background debug pins.
The system is fed with 5 volts input power. The input power is passed through a diode to provide the protection against reverse polarity. The power to the digital butler remote comes from an external power supply module. The external power supply module will provide power to the remote and for charging the battery. The input power is fed through a connector. From the 5 volts input, the following voltages are derived on the CPU card: Processor core voltage: The core supply for the processor is generated through a low dropout regulator that can support current up to 1.5A operating from a 5V-input. The output 1.8V is fed to the core of the processor. PLL voltage: The core voltage is the input to the PLL through a ferrite bead, which supplies power to clock generation and PLL circuits of the processor.
Data sheets publicly available for the major IC components include:

1. LPC213x Philips User manual Nov. 22, 2004.
2. Zeevo ZV4301 Datasheet Jan. 24, 2005.
3. P89LPC930/931 Data Sheet, Rev.05-15 Dec. 2004.
4. DDG128032AAD Data sheet, Rev1.0, Issue date: 2004/10/06
5. ITT Cannon, Miniature all direction scanning switch Data sheet.
6. Authentec Fingerprint sensor AES 3400 Data sheet.
7. MSM7716 OKI Datasheet Version August 1998.
8. AT49BV802A Datasheet, Document 3405D-Flash-March/2005.

In addition, a camera can be incorporated into the remote, thereby enabling video conferencing and other visual features. The camera is complemented by a glue logic application supplied for or native to a communications and/or multimedia console, such as one running under Windows, OS X or Linux. A CMOS camera commercially available for incorporation in camera phones may be suitable for this application. This is illustrated in FIG. 7.
FIG. 7 depicts building the digital butler remote board as an XScale processor based solution with a camera module and/ or memory card reader. This remote is built around the Intel XScale micro controller or a digital signal processor (DSP). The main processor provides interfaces for the Keypad, Joystick, 320*240 graphics LCD module, fingerprint sensor, Bluetooth SOC, WiFi 802.11b/g module, audio codec, camera module and memory card reader. The audio codec interfaces with a microphone, speaker and headphone for voice utilities. Alternatively, the microphone, speaker and headphone could interface through the Bluetooth module, as described in the context of FIG. 1. A general USB dongle interface (not shown) could be provided to allow the user to use the USB port as if it resided on the host device. The USB port of the remote would function as a remote USB connection for the host.

From FIG. 7, the components include the main processor 700, which couples to the Bluetooth module 732, WiFi module 751 and audio codec 741. The audio codec couples to speaker 752, microphone 751, audio jack 753. The main processor also may couple to a fingerprint sensor 721 and a battery pack 712. A battery charger and power management component 724, such as a cradle, couples to a DC power input 713 and charges the battery 712. The main processor also may couple to a camera module 750, a display 733, a keypad 711 and joy stick 723. The camera module may, for instance, be a 3 mega pixel CMOS component. The memory card reader 760 can support one or more memory card formats. Currently used memory card formats, as of submission of this disclosure, include PC Card, CompactFlash I and II, SmartMedia, Memory Stick, Memory Stick Duo and Micro M2, Multimedia regular, reduced size and micro, Secure digital regular, mini and micro, xD-Picture card and μ card. The main processor 700 provides an array of ports for interfacing with these various components. While currently available components are generally identified, such as by resolution or wireless standard, one of skill in the art will recognize that these components will evolve over the 20 year life of a patent.

Remote Software

Software components of the palm-held remote include an LCD interface module, a keyboard interface module, a fingerprint sensor module, trackball or other directional device interface module and a Bluetooth module. Other wireless protocols such as IEEE 802.1/x protocols can be substituted for Bluetooth. Wireless protocols developed for cordless telephones also might be used. Data is transmitted and received over Bluetooth or another wireless connection between the console and the palm-held remote in a custom data format. In this format, a record may have fields including start of packet, packet type, links, data and checksum. Different packet types are assigned to keyboard, trackball, fingerprint and LCD packets. The start of packet field indicates that the packet starts here. For instance, 0x7C can be used as a start of packet flag. A data field of just two bytes may be sufficient. When the checksum contains an XOR of all the data, link and packet type fields, the checksum field can be used to discard corrupted data packets.

Audio support enables the remote to act as a remote speaker and/or microphone system for the host system. Audio support can be for mono, stereo or other advanced sound reproduction modes. The audio can function in an on-the-ear mode (e.g., like a telephone headset), with a headset or as a speaker phone. These audio features can enable telephonic capabilities for voice, place-shifting audio from the host location to another room or floor in a home, private listening via a wired or wireless headset and multiple stream playback, so that the audio reproduced at the remote is different from the audio reproduced on speakers wired to the host.

The LCD connected to the main controller uses the GPIO interface, including data and control lines. The LCD can be used to display data received over the wireless link. The data could be received in an HTML or HTML subset format and rendered by a compact browser module. Or, a custom-designed packet format could be used for LCD data. This format includes eight fields: start of packet, packet type, link, mode, x-position, y-position, data and checksum. The mode field indicates the mode in which the data is to be displayed. This module operates in two modes, a so-called font mode and a byte mode. In a phone mode, the given string is displayed on the LCD display in the predefined font shape and size. In the byte mode, the given date is displayed as raw data, which allows the user to design their own shapes. X- and Y-position coordinates indicate the row and column position on the LCD.

The remote control can duplicate the visual operation of an on-screen display generated by a controlled device, using a display on the remote. The on-screen display interface is designed to provide easy, smooth, seamless operation of the device. However, most remotes provide an array of buttons and much different interface than the on-screen display. Sometimes, the array of buttons anticipates that no screen will be available for display. Other times, the manufacturer overbuilds the remote control. They attempt to expose all of the functionality of the host device through individual keys on the remote. The sheer number of keys sometimes pushes controlled devices into states of operation that are surprising, confusing and difficult to undo. A high resolution display on the remote control can enhance the user interface. For devices that accept keyboard or joystick/mouse responses to an on-screen display, the remote can substantially duplicate the look and feel of the on-screen display. In this instance, substantially means to the extent allowed by the form factor of the remote display. For instance, the same HTML code may be differently rendered to the on-screen display and the remote display, given the different dimensions of the displays.

An on-screen menu and controls module can render a control interface, translating a device menu and controls display that would normally appear on a TV or monitor for reproduction on a display that is part of the remote. To implement this capability, a menu-generating device can assemble on-screen menus and controls as a separate data stream, apart from any video image that the menus and controls overlay. The data stream can be supplied both to the device's own on-screen overlay generator and to a communications module coupled to the remote. The remote uses the data stream to render the on-screen display in a legible format, adapted to the reduced size of a screen on the remote. Preferably, the menu and control organization format on the remote mimics what the viewer can see on the screen, to minimize confusion. Technologies such as a subset of HTML and JavaScript allow a designer to specify a menu and control layout in terms that permit rendering to a variety of display sizes. Remote display of the on-screen menu and control data stream may preempt a video image display or may be overlaid on top of the video image. Optionally, the device's on-screen menu and controls can be supplied to the remote exclusively as a data stream and not as part of a rendered video stream, to avoid confusing menus of different sizes. Alternatively, the on-screen menus and controls may just appear on the remote's display as a consequence of being rendered to a TV or monitor that is reproduced on the remote's display.

One of skill in the art will recognize that a display in the palm of the hand will be useful to many people, because it reduces demands for eye-hand coordination and short-term memory. The form factor is convenient. A single remote can control for many devices. Depending on the features combined into the remote, varying complexity can be delivered at varying prices.

The on-screen display module can be more or less stateful. JavaScript, for instance, can be used to keep track of the user's intermediate selections until they are sent to the host. Or, a Java or similar application could replicate the states of the host. More simply, the display could be essentially stateless and rerendered by the host after each data transfer from the remote to the host.

The form factor of the remote display could alternatively be a full display with touch sensitive areas and rendered buttons that provide visual and/or audio feedback (as opposed to the tactile feedback of pressed buttons.)

The keyboard module of the remote is implemented using an 8051. The key press data is sent to the main microcontroller through an I2C interface for further processing. The keyboard is a matrix keyboard including 13 scan lines and eight return lines. A key press causes the 8051 to generate make and break codes along with key press values. This data is given to the main micro controller, which operates in an interrupt mode. Here, the 8051 acts as a master and the LPC2132 acts as a slave.

Fingerprint sensor software uses SPI code on the main controller. The fingerprint data will be sent in a particular packet format over the wireless link to be processed on the host side. Authentec provides a useable appropriate library of routines for fingerprint authentication.

Coupled to the fingerprint sensor software is a personalization module. If a user does not identify himself by swiping the fingerprint sensor, then a generic profile is applied to personalization of music, movies, photos, videos, files and telephone access. If the user swipes the fingerprint sensor, then personalization can be applied, analogous to switching users in current Windows XP implementations. This degree of context shifting based on a single action at a remote control is new in this disclosure. The personalization may include: favorite channels/movies/shows in a streaming video environment; favorite music, photos or video in an on demand environment; approved access to DRM-controlled content using one or more keys linked to the fingerprint; history of searches, recent topics, personal interest (a la Google Sidebar or Claria PersonalWeb), recently accessed files; automatic authenticated access to communication channels linked to the fingerprint, such as voice over IP, instant messaging, web conferencing and e-mail; electronic wallet access, automatically looking up credit card information and other account authorization information; and sharing of information by person logged in.

The trackball or other pointing device interface module uses sampling techniques to read the ball movement and click button states. The outputs of the trackball are connected to general-purpose I/O channels. The modules sense the state of the general-purpose I/O's at a predetermined frequency, such as 1 kHz.

A Bluetooth wireless interface module may be based on Zeevo ZV4301 Bluetooth SOC or a Broadcom or RFMD design with headset and serial port profile (SPP) firmware. This module is coupled to the main controller through a UART. The module is adapted to convey wirelessly a mix of keyboard data, trackball data, fingerprint sensor data for authentication and data to be displayed on the remote module's display.

Console Hardware

Introduction

The core component of the console or host system may be a standard mini ITX mother board with ports to add peripherals. A USB Bluetooth module and USB WLAN module may be connected to the motherboard through USB ports. A display is connected through VGA connector and the socket modem with RJ11 connector is connected through serial port 2. The remaining ports can be used for external interface. The wireless remote communicates over Bluetooth with the USB Bluetooth module.

Features

FIG. 6 is a block diagram of the console (606). The host console of the system may be built on a standard Mini-ITX motherboard and an additional add-on board to support the features like WAP, Bluetooth, and a MODEM for PSTN and a PCI-VGA Card. A standard Mini ITX is available in a 17 cm×17 cm form factor. The motherboard and/or add-on board may include two VGA connectors; for example, a VGA connector from motherboard (613) and a second VGA connector using a PCI add-on card (614). The design also may include a serial port for external interface (611A) and another serial port for a modem (611B), two USB ports (612B), support for a USB-hub, an 802.11 g WLAN module (632), preferably interoperable with 802.11b, with a separately connected antenna. Other console components may include a USB to Bluetooth module (632) with chip antenna, a standard PC hard disk drive (623) and DVD drive (624) and an ATX power supply or Mini-ITX power module.

Motherboard support may include a VIA Eden/C3 processor at operating at 1.0-1.5 GHz or another rate, integrated Castle Rock graphics with MPEG-2 decoder (optionally an MPEG-4 decoder for video), a memory socket, such as al DDR266 SODIMM socket, a PCI slot, two UltraDMA 66/100/133 connectors (SATA connectors can be used), a 10/100 Base-T Ethernet physical connection, PS2 mouse and keyboard ports; a parallel port, an RJ-45 LAN port, a serial port, two USB 2.0 ports and a VGA port.

A socket modem module (634) is one component used to connect the motherboard to a POTS telephone system. Alternatively, modules can interface the motherboard to a cellular or similar telephone system or to a voice over IP (VoIP) system. One suitable module is a WMV34-0-TSM-100 from Analog Devices. This serial socket modem provides complete worldwide support. An Analog Devices serial socket modem features a solid state DAA that supports international operation with compliance to international telephone standards. The modem module can be plugged on the carrier board by means of board to board connectors and will be interfaced to the additional serial port available on the motherboard header. The socket modem module is powered by 3.3V DC supply and the interfacing signals are in the 3.3V LVTTL level. The socket modem module has the connections for a telephone line. This connection will be terminated to a RJ11 jack (635) on the carrier board for this purpose. The serial port signals in the motherboard are terminated to header COM2 which is in RS232 level. A RS232 transceiver interfaces (631) to the modem (634).

A standard, off-the-shelf 802.11 g WLAN module (632) is available module with USB interface. The module can be connected to the USB port available on the motherboard header. An external antenna may be positioned at the rear panel of the host system for maximum sensitivity. Some suitable modules include the Linksys-WUSB54GP and NetGear-WG111. These modules are interoperable with 802.11b. A WLAN module may be an alternative to a Bluetooth module for communications with the remote, or can provide a network interface for the console.

A standard, off-the-shelf Bluetooth module (633) is available module with USB interface. The module may be connected to the USB port available on the motherboard header. The module will be connected to the host system by the USB port available on the motherboard header. The modules built around CSR chipset may be suitable.

The power supply used may be a standard mini ITX power supply. A standard 12 volts DC power module also can be used for this purpose. The power supply board includes DC-DC converters to provide output voltages of +12V, −12V, +3.3V, and +5V DC, similar to an ATX power supply. These power supply tapping is used in the carrier board to supply power to the add on modules such as socket modem, WLAN, and Bluetooth modules.

Console Software
  Introduction
  A Linux core runs on the VIA Eden processor. The module drivers loaded on the OS core takes control the peripheral devices. A dedicated software application running parses data received wirelessly, such as over Bluetooth. It also redirects the data to corresponding modules.
  Modules
  The modem connected with the host system motherboard is used to make the dial-up connections. This makes the socket modem module as a portable one.
  On the console or host system processor side, the serial driver initializes and configures the serial port baud rate equal to the modem baud rate. An appropriate modem driver is loaded to manipulate the connected socket modem. A WLAN module is a port of the Linux-WLAN driver, adapted to the host board. The USB WLAN modules identified from Linksys and NetGear use the same driver. Once the WLAN hardware is connected to the USB port, it is logically connected to the access point using the WLAN control utility.
  A suitable Linux Bluetooth software stack is BlueZ. Processing data from the stack involves developing parsing the data received from the remote. The communication with the remote is established using the Bluez utilities from the host for remote headset and serial port functionalities. Once the application knows the source of the data packet, it redirects the data to the appropriate module for the required functionality. The software also provides a facility to send the data to the LCD available on the remote side. The application developer can use the fingerprint raw data received from the Bluetooth remote and the authentication code libraries provided by the vendor to achieve the matching operation.
    The console may support the following functions:
    Bluetooth remote access.
    WLAN enabled for network communication.
    Socket modem module for dial-up network connection.
    The following combinations of hardware and software features are within the scope of this disclosure for providing services described. Supported by the console, one or any combination of the following:

General Purpose Computer

TV Set Top Box w/ optional personal video recorder (PVR)

Terrestrial, Cable, Satellite, IP

Messaging console (one or any combo)

Text (SMS/Webpages)

Voice (Landline/cell/IP)

Video

Network Port

TV and/or Monitor Out

Optionally

Hard Drive

Media Card Reader (non-volatile memory)

CD/DVD (Writable versions possible)

Wireless network router
  Supported by the hand-held remote, one or any combination of the following:

Fingerprint—Optional

Speaker/Mic/Vol control

Display

Cursor Control

Thumb-board (Alphanumeric)

Video Camera

Media Reader

USB port
  Applied to the following services:

Communication, including Phone (LL/Cell/IP), Internet, email, and text/voice/video messenger Entertainment, including Multimedia apps, including TV, PVR, DVD, Video, Photo, Music, Radio, and Games.

Productivity apps, such as a personal information manager (PIM), contacts, calendar, editor.

Some Particular Embodiments
  The present invention may be practiced as a method or device adapted to practice the method. The same method can be viewed from the perspective of a console adapted for use with a remote, a remote adapted to control a console or a combination of console and remote.
  While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

I claim as follows:

1. A master device, adapted to be controlled by a remote control device that needs only limited computing capabilities and that includes slaved control and audio I/O features, the master device including:
  a limited range radio;
  hardware resources coupled to the radio;
  a light weight protocol stack running on the hardware resources and exchanging packets with a remote control device;
  an IP protocol stack running on the hardware resources and exchanging packets with at least one signal source;
  control interpretation logic running on the hardware resources, logically coupled to the light weight protocol stack, that processes input received from a slaved keyboard and from a slaved navigation device on the remote control and responsively controls the master device, including selection of audio and/or video for playback;

call processing logic running on the hardware resources, logically coupled to the IP protocol stack and the light weight protocol stack, that
receives voice over IP (VOIP) audio signal packets from the signal source, transcodes them to a remote control device format suitable to drive at least one slaved output on the remote control device, and forwards them to the remote control device;
receives control signals from the remote control device and responsively initiates or answers a telephone call; and
receives audio signal packets from a slaved microphone on the remote control device, transcodes the audio signal packets into transcoded audio packets and forwards the transcoded audio packets to the signal source; and
display logic running on the hardware resources, logically coupled to the light weight protocol stack, that composes a first visual display and forwards the first visual display to the remote control device.

2. The master device of claim 1, further including:
an output port adapted to drive a monitor device, coupled to the hardware resources; and
monitor logic running on the hardware resources that composes and forwards to the output port a second visual display, which the master device navigates responsive to the slaved navigation device.

3. The master device of claim 1, further including:
a DVD/CD player coupled to the hardware resources, to the audio and/or video playback logic and to the control interpretation logic; and
audio and/or video playback logic running on the hardware resources, logically coupled to the light weight protocol stack, that transcodes compressed audio and/or video into a remote control device format suitable to drive at least one slaved output on the remote control device;
wherein the control interpretation logic further controls playback from the DVD/CD player.

4. The master device of claim 1, further including:
port control logic running on the hardware resources, logically coupled to the light weight protocol stack, that treats a USB adapter on the remote control as a port local to the master device.

5. The master device of claim 1, further including:
port control logic running on the hardware resources, logically coupled to the light weight protocol stack, that treats a media card reader on the remote control as a device local to the master device.

6. The master device of claim 1, further including:
fingerprint data processing logic running on the hardware resources, logically coupled to the light weight protocol stack, that processes raw fingerprint data received from the remote control device and uses the processed fingerprint data to authenticate a user.

7. The master device of claim 6, further including:
personalization logic running on the hardware resources that personalizes a user's call processing based on the authentication of the user from the processed fingerprint data.

8. The master device of claim 1, further including:
authentication data processing logic running on the hardware resources, logically coupled to the light weight protocol stack, that processes raw authentication data received from the remote control device and uses the processed authentication data to authenticate a user.

9. The master device of claim 8, further including:
personalization logic running on the hardware resources, logically coupled to the light weight protocol stack, that accepts a user identification and personalizes the user's call processing based on the user identification.

10. The master device of claim 1, wherein the limited range radio is one of:
compliant with a Bluetooth standard,
complaint with an 802.11n standard,
compliant with an 802.11b/g standard, or
utilizes a cordless home telephone technology.

11. The master device of claim 1, wherein the light weight protocol stack is a Bluetooth protocol stack.

12. The master device of claim 11, further including:
image processing logic running on the hardware resources, logically coupled to the light weight protocol stack, that accepts transfer of sensor data from a camera sensor on the remote control device and translates the sensor data into an image stored in memory.

13. The master device of claim 11, further including:
DRM key processing logic running on the hardware resources, logically coupled to the light weight protocol stack, that accepts transfer of a DRM key from the remote control device and processes the DRM key to satisfy DRM requirements of the master device or of the at least one signal source.

14. A master device, adapted to be controlled by a remote control device that needs only limited computing capabilities and that includes slaved control and audio I/O features, the master device including:
a limited range radio;
hardware resources coupled to the radio;
an output port adapted to drive a monitor device, coupled to the hardware resources;
a light weight protocol stack running on the hardware resources and exchanging packets with a remote control device;
control interpretation logic running on the hardware resources, logically coupled to the light weight protocol stack, that processes input received from a slaved keyboard and from a slaved navigation device on the remote control and responsively controls the master device, including selection of audio and/or video for playback;
port control logic running on the hardware resources, logically coupled to the light weight protocol stack, that treats a media card reader on the remote control as a device local to the master device;
audio and video playback logic running on the hardware resources, logically coupled to the light weight protocol stack, that transcodes compressed voice over IP (VOIP) audio and video into a remote control device format suitable to drive at least one slaved output on the remote control device; and
monitor logic running on the hardware resources that composes and forwards to the output port a visual display, which the master device navigates responsive to the slaved navigation device.

15. The master device of claim 14, further including:
an output port adapted to drive a monitor device, coupled to the hardware resources; and
monitor logic running on the hardware resources that composes and forwards to the output port a second visual display, which the master device navigates responsive to the slaved navigation device.

16. The master device of claim 14, further including:
a DVD/CD player coupled to the hardware resources, to the audio and/or video playback logic and to the control interpretation logic; and
audio and/or video playback logic running on the hardware resources, logically coupled to the light weight protocol stack, that transcodes compressed audio and/or video into a remote control device format suitable to drive at least one slaved output on the remote control device;
wherein the control interpretation logic further controls playback from the DVD/CD player.

17. The master device of claim 14, further including:
port control logic running on the hardware resources, logically coupled to the light weight protocol stack, that treats a USB adapter on the remote control as a port local to the master device.

18. The master device of claim 14, further including:
fingerprint data processing logic running on the hardware resources, logically coupled to the light weight protocol stack, that processes raw fingerprint data received from the remote control device and uses the processed fingerprint data to authenticate a user.

19. The master device of claim 14, further including:
personalization logic running on the hardware resources that personalizes a user's call processing based on the authentication of the user from the processed fingerprint data.

20. The master device of claim 14, further including:
authentication data processing logic running on the hardware resources, logically coupled to the light weight protocol stack, that processes raw authentication data received from the remote control device and uses the processed authentication data to authenticate a user.

21. The master device of claim 14, further including:
personalization logic running on the hardware resources, logically coupled to the light weight protocol stack, that accepts a user identification and personalizes the user's call processing based on the user identification.

22. The master device of claim 14, wherein the limited range radio is one of:
compliant with a Bluetooth standard,
complaint with an 802.11n standard,
compliant with an 802.11b/g standard, or
utilizes a cordless home telephone technology.

23. The master device of claim 14, wherein the light weight protocol stack is a Bluetooth protocol stack.

24. The master device of claim 23, further including:
image processing logic running on the hardware resources, logically coupled to the light weight protocol stack, that accepts transfer of sensor data from a camera sensor on the remote control device and translates the sensor data into an image stored in memory.

25. The master device of claim 23, further including:
DRM key processing logic running on the hardware resources, logically coupled to the light weight protocol stack, that accepts transfer of a DRM key from the remote control device and processes the DRM key to satisfy DRM requirements of the master device or of the at least one signal source.

* * * * *